United States Patent
Findeisen et al.

[11] 3,912,754
[45] Oct. 14, 1975

[54] ORGANIC POLYISOCYANATES AND METHOD OF MAKING THEM

[75] Inventors: Kurt Findeisen, Leverkusen; Kuno Wagner, Leverkusen-Steinbuechel, both of Germany

[73] Assignee: Bayer Aktiengesellschaft, Leverkusen, Germany

[22] Filed: June 3, 1974

[21] Appl. No.: 476,121

[30] Foreign Application Priority Data
June 8, 1973  Germany.............................. 2329300

[52] U.S. Cl...................... 260/309.5; 260/77.5 AQ
[51] Int. Cl.²......................................... C07D 49/34
[58] Field of Search................................. 260/309.5

[56] References Cited
OTHER PUBLICATIONS
Chem. Abstracts, 1964, 16165e.

*Primary Examiner*—Ethel G. Love
*Attorney, Agent, or Firm*—Joseph C. Gil

[57] ABSTRACT

Organic polyisocyanates which are a reaction product of an excess of an organic polyisocyanate and hydrocyanic acid have the formula

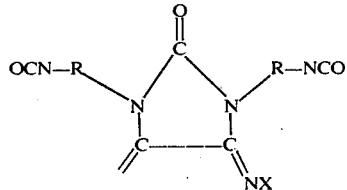

in which
R represents an aliphatic $C_2$ to $C_{12}$ cycloaliphatic $C_4$ to $C_{15}$, aromatic $C_6$ to $C_{15}$ or araliphatic $C_7$ to $C_{15}$ hydrocarbon radical, and
X represents hydrogen or a group of the formula

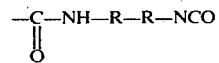

wherein R has the same meaning as above.

The compounds are useful in the production of polyurethanes.

5 Claims, No Drawings

ORGANIC POLYISOCYANATES AND METHOD OF MAKING THEM

This invention relates generally to organic polyisocyanates and more particularly to novel organic polyisocyanates, to a method for preparing them and urethanes prepared therefrom.

Organic polyisocyanates are reacted with organic compounds having reactive hydrogen atoms in the production of polyurethanes. Some of these polyurethanes are used in making coatings or for forming self-sustaining films. One of the problems encountered in making polyurethane lacquers or other coatings and films has been that many of the polyurethanes have poor light stability. The coating or film has a tendency to discolor after exposure to light. It has been proposed to improve the light stability of a polyurethane by using an aliphatic polyisocyanate such as hexamethylene diisocyanate, but polyurethane coatings and films which are entirely satisfactory from the standpoint of light stability, solvent solubility, vapor pressure and compatibility with other components of a lacquer or film have not been available heretofore.

It is therefore, and object of this invention to provide novel organic polyisocyanates which are particularly advantageous in the preparation of polyurethane lacquers and other polyurethane films. Another object of the invention is to provide a process for making the novel polyisocyanates. Still another object of the invention is to provide polyurethanes prepared by a reaction in which the novel polyisocyanate is one of the reactants.

The foregoing objects and others are accomplished in accordance with this invention, generally speaking, by providing new polyisocyanates corresponding to the general formula

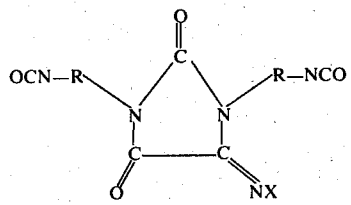

in which
R represents an aliphatic $C_2$ to $C_{12}$, cycloaliphatic $C_4$ to $C_{15}$, aromatic $C_6$ to $C_{15}$ or aralphatic $C_7$ to $C_{15}$ hydrocarbon radical, and
X represents hydrogen or a group of the formula

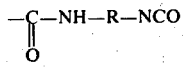

wherein R has the same meaning as above.

The invention also provides a process for the production of polyisocyanates corresponding to the general formula

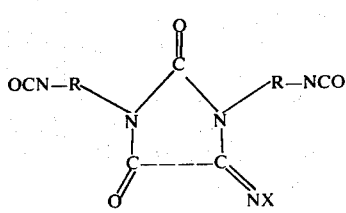

where R and X are as defined above,
which is distinguished by the fact that 1 mol of hydrocyanic acid or a quantity, corresponding to 1 mol of hydrocyanic acid, or a compound which liberates hydrocyanic acid is reacted with at least 2 mols of an organic diisocyanate of the general formula $R(NCO)_2$ at temperatures of from $-25°C$ to $+200°C$. R is as above.

The fact that the isocyanates according to the invention can be otained by the process according to the invention in which a large excess of diisocyanate is used is completely surprising and had not been apparent from the prior art because it is known from Annalen der Chemie, 562 (1949) 205–266, that hexamethylene dicyanoformamide is formed when hydrogen cyanide is reacted with hexamethylene diisocyanate. It is known from German Offenlegungsschrift No. 2,113,488 that the reaction of a diisocyanate with hydrogen cyanide in the presence of a catalyst gives polymers whose radicals contain organic radicals and 1,3-imidazolidine-1,3-diyl rings in alteration.

The process according to the invention may be carried out at temperatures of from about $-25°C$ to about $+200°C$ and preferably at temperatures of from about $25°C$ to about $180°C$, optionally in the presence of suitable catalysts and/or other auxiliaries and additives. To carry out the process according to the invention, it is possible, for example, to introduce the reactants in admixture with one another into the reaction vessel and to start the reaction by adding the catalyst. It is also possible, for example, initially to introduce diisocyanate and catalyst into the reaction vessel and subsequently to add hydrocyanic acid or a compound which liberates hydrocyanic acid.

In general, from about 2 to about 50 mols and preferably from about 5 to about 15 mols of diisocyanate are used per mol of hydrocyanic acid or a quantity, corresponding to 1 mol of hydrocyanic acid, of a compound which liberates hydrocyanic acid in the process according to the invention. The end of the reaction between hydrocyanic acid and diisocyanate can be recognized from weakening of the heat effect which occurs when the reactants are combined with the catalyst.

If desired, unreacted diisocyanate can be removed on completion of the reaction, for example, by thin-layer or rotary distillation or by extraction with solvents such as, for example, cyclohexane, hexane or petroleum ether. However, the solutions of the new polyisocyanates in the diisocyanates used as starting compounds obtainable by the process according to the invention are also suitable for a number of applications which will be described in more detail hereinafter. The preferential formation of diisocyanates or triisocyanates corresponding to the above general formula can be influenced by control of the length of the heating period and control of temperature. The triisocyanates are formed through a secondary reaction, i.e., through reaction of the excess diisocyanate used as starting material with the diisocyanate according to the invention ($X = H$). In addition, heating the reaction mixture for several hours to elevated temperatures results in the formation of mixtures which, in addition to the diisocyanates and triisocyanates according to the invention, contain higher molecular weight homologues containing allophanate groups. These higher molecular weight homologues which contain allophanate groups are formed through reaction of the free isocyanate groups present in the reaction mixture with the urethane groups also present in the reaction mixture. In addition to the formation of higher molecular weight homologues containing allophanate groups, the formation of polyisocyanates containing uretdione, biuret or isocyanate groups can also be expected at an elevated temperature. If the formation of these secondary products is not desired, it is advisable to carry out the process according to the invention at a low temperature in the range of from about 25°C to about 80°C, the reaction mixture being heated to this temperature over a period of from about 30 to about 120 minutes.

Provided that these precautionary measures are taken, products of which at least 70% by weight and preferably at least 90% by weight consist of the diisocyanates and triisocyanates corresponding to the above general formula are obtained following removal of the excess starting diisocyanate.

The catalysts used can generally be left behind in the reaction products without any adverse effect upon the stability of the end products in storage. In cases where the catalysts used in accordance with the invention have a detrimental effect in the production of plant protection agents, polyurethane plastic, lacquers and films, they can be removed by filtration, centrifuging or decantation (insoluble catalysts) or deactivated by alkylation, acylation or salt formation.

Hydrocyanic acid as such and compounds which liberate hydrocyanic acid under the reaction conditions can be used for the process according to the invention. Typical representatives of compounds such as these are, for example, addition products of hydrocyanic acid with aldehydes or ketones (cyanhydrins), such as in particular acetone cyanhydrin. Addition products of hydrocyanic acid with diisocyanates, especially the type suitable for use as starting material in the process according to the invention, can also be used.

The process according to the invention can be carried out with any organic diisocyanate of the general formula $R(NCO)_2$, wherein R has the meaning given above and preferably represents an aliphatic hydrocarbon radical with from 4 to 8 carbon atoms, a cycloaliphatic hydrocarbon radical with from 5 to 10 carbon atoms or an araliphatic hydrocarbon radical with from 8 to 15 carbon atoms. Preferred aliphatic, cycloaliphatic and araliphatic diisocyanates include, for example, tetramethylene diisocyanate; pentamethylene diisocyanate; hexamethylene diisocyanate; 1,3-cyclopentylene diisocyanate; 1,4-cyclohexylene diisocyanate; 1,2-cyclohexylene diisocyanate; hexahydroxylene diisocyanate; 4,4'-dicyclohexyl diisocyanate; 1,2-di-(isocyanatomethyl)-cyclobutane; 1,3-bis-(isocyanatopropyl)-2-methyl-2-propylpropane; 1-methyl-2,4-diisocyanatocyclohexane; 1-methyl-2,6-diisocyanatocyclohexane; bis-(4-isocyanatocyclohexyl)-methane; 1,4-diisocyanatocyclohexane and 1,3-diisocyanatocyclohexane; m- and p-xylylene diisocyanate; 3,3,5-trimethyl-5-isocyanatomethylcyclohexyl isocyanate; 2,6-diisocyanato-caproic acid ester; the β-isocyanatoethyl, the γ-isocyanatopropyl esters of isocyanatocaproic acid and the like.

The following represent particularly preferred aliphatic, cycloaliphatic and araliphatic diisocyanates; hexamethylene diisocyanate; the isomer mixture of 1-methyl-2,4-diisocyanatocyclohexane and 1-methyl-2,6-diisocyanatocyclohexane; bis-(4-isocyanatocyclohexyl)-methane; m- and p-xylylene diisocyanate; 3,3,5-trimethyl-5-isocyanatomethylcyclohexyl isocyanate; methyl-substituted hexamethylene and pentamethylene diisocyanate and 2,6-diisocyanatocaproic acid-$C_1$-$C_4$-alkyl esters.

If desired, it is, of course, also possible to use aromatic diisocyanates in the process according to the invention provided that the end products are not intended to be fast to light.

Examples of suitable aromatic diisocyanates include 1-methylbenzene-2,4-diisocyanate; 1-methylbenzene-2,6-diisocyanate; commerical tolylene diisocyanate mixtures; m- and p-phenylene diisocyanate; naphthylene diisocyanate; diphenylmethane diisocyanates; di- and tri-isopropylbenzene diisocyanates; 1-(isocyanatophenyl)-ethyl isocyanate; also diisocyanates substituted by a variety of different substitutents such as, for example, alkoxy-, nitro-, chlorine- or bromine-substituted diisocyanates. Mixtures of different polyisocyanates can also be used for the formation of imino-imidazolidine-diones.

A number of other diisocyanates suitable for use in the process according to the invention are known from the literature, for example, W. Siefken, Annalen der Chemie, 562 6–136 (1949).

Any of the suitable compounds of the kind known per se from polyurethane chemistry which accelerate the isocyanate polyaddition reaction may be used as catalysts in the process according to the invention. Compounds of this kind are, in particular, tertiary amines such as, for example, triethylamine, diazabicyclo-(2,2,2)-octane, 1,5-diazabicylco-(4,3,0)-non-5-ene, 1,8-diazabicyclo-(5,4,0)-undec-7-ene, dimethylaniline, dimethylbenzylamine, pyridine, 2-, 3-, 4-picoline, N,N-diethylaniline, quinoline, N-methylpiperidine, N-methyl dicyclohexylamine, N,N-dimethylcyclohexylamine, N-cyclohexylpiperidine, N-cyclohexylmorpholine, 2,6- and 2,4-lutidine; organotin compounds such as, for example, dibutyltindilaurate, bis-(tributyltin)-oxide, dibutyltin-bis-(2-ethylhexoate) or tetrabutyltin. Other suitable catalysts include lead compounds such as trimethyl lead acetate or N-(tri-n-butyl lead)-imidazole or phosphorus compounds such as triphenylphosphine or tributylphosphine and basic salts of hydrocyanic acid, such as sodium cyanide or potassium cyanide.

The catalysts mentioned by way of example are used in any suitable catalytic amount, preferably, from 0.01 to 3 mol % and preferably in quantities of from 0.05 to 1 mol %, based on the hydrocyanic acid or hydrocyanic acid donor, in the process according to the invention.

The process according to the invention can be carried out either in substance or even in the presence of any suitable inert organic solvent for the reactants. Examples of suitable inert solvents include aliphatic and cycloaliphatic hydrocarbons, halogen-containing hydrocarbons such as methylene chloride, chloroform, di- and tri-chloroethylene, aromatic solvents such as benzene, toluene, xylene, halogenated aromatic solvents such as chlorobenzene, dichlorobenzene, and trichlorobenzene, dioxan, ethylacetate, ethylglycolacetate, acetone, acetonitrile, dimethyl formamide and mixtures of these solvents.

The new polyisocyanates provided by the invention with their imino-imidazolidine-dione structure represent a new class of organic polyisocyanates. The fact that they are compounds with the general structure specified earlier is apparent from molecular-weight determination and from infrared [Makromol. Chem. 78, 191 (1964)], nuclear-resonance and mass-spectroscopic data. The new compounds are suitable for use as intermediate products in the production of plant-protection agents and, in particular, represent valuable starting compounds for the production of polyurethane plastics. In particular, the polyisocyanates according to the invention containing aliphatic isocyanate groups represent valuable starting compounds for the production of light-stable polyurethane lacquers and films. The new polyisocyanates are readily soluble in the usual lacquer solvents and are highly compatible with pigments. Another advantage of considerable practical significance is their greatly reduced vapor pressure by comparison with the corresponding diisocyanates used as starting material and, hence their physiological acceptability.

EXAMPLE 1

2523 g of hexamethylene diisocyanate (15 mols) are mixed with 60 ml of hydrocyanic acid (1.5 mol) and 1.5 g of diazabicyclooctane, which produces a slight increase in temperature to 39°C. On completion of the exothermic reaction, the reaction mixture is stirred for 1 hour at room temperature and for 2 hours at 60°C before the reaction product is separated off from excess hexamethylene diisocyanate in a thin-layer evaporator. The yield is 610 g of a polyisocyanate comprising essentially diisocyanate with an imino-imidazolidine-dione structure;

IR: 2265, 1795, 1745, 1690, 1670 cm$^{-1}$
NCO: calculated on the basis of the structure of the corresponding diisocyanate: 23.1%, found: 23.2%
$\eta_{20°C}$: 4320 cP

| Analysis: calculated on the basis of the structure of the corresponding diisocyanate | C | H | N | O |
|---|---|---|---|---|
| | 56.18 | 6.93 | 19.27 | 17.01 |
| found | 56.1 | 6.90 | 19.20 | 17.5 |

EXAMPLE 2

In a three-necked flask, 1680 g (10 mols) of hexamethylene diisocyanate are heated to 180°C and 20 ml of hydrocyanic acid (0.5 mol) added gradually following the addition of 0.05 g of triethylamine. The reaction mixture is stirred for 1 hour and then left to cool. The excess hexamethylene diisocyanate is separated from the other components of the mixture by extraction with n-hexane.

The yield is 260 g of a polyisocyanate comprising essentially triisocyanate with an imino-imidazolidine-dione structure.

The viscous, clear reaction product pours easily. The isocyanate content calculated on the basis of the structure of the corresponding triisocyanate was 23.7% and that found was 23.6%.

$\eta_{20°C}$: 4320 cP

| Analysis: calculated on the basis of the structure of the corresponding triisocyanate | C | H | N | O |
|---|---|---|---|---|
| | 56.50 | 6.97 | 18.47 | 18.15 |
| found | 56.40 | 7.0 | 18.5 | 18.1 |

53.1 g of the polyisocyanate of imine-imidazolidine-dione structure (23.6% NCO) synthesized according to Example 2 are dissolved in 200 ml of isopropanol and the resulting solution heated to reflux over a period of 4 hours. The excess isopropanol is distilled off and the viscous residue analyzed.

Yield: 72 g of a triurethane with the following idealized structure.

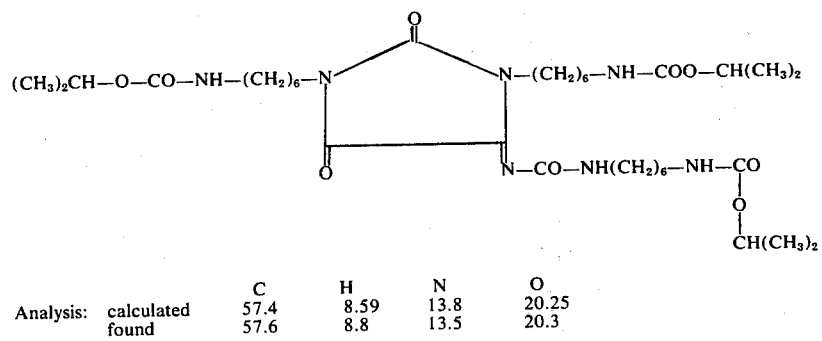

| Analysis: | C | H | N | O |
|---|---|---|---|---|
| calculated | 57.4 | 8.59 | 13.8 | 20.25 |
| found | 57.6 | 8.8 | 13.5 | 20.3 |

Mw. calculated: 711; found: 760

EXAMPLE 3

0.1 g of dimethylbenzylamine is added at room temperature to 1044 g (6 mols) of 1-methylbenzene-2,4-diisocyanate, followed by heating to 120°C after the addition of 40 ml of hydrocyanic acid (1 mol). After about 30 minutes, the reaction mixture is cooled to room temperature and added dropwise to cyclohexane, a white, solid product with a melting range of 135° to 140°C being obtained after filtration and drying. 353 g of a polyisocyanate comprising essentially triisocyanate with an imino-imidazolidine-dione structure, as established by spectroscopy, and an isocyanate content of 22.5% are obtained. In the excess 1-methylbenzene-2,4-diisocyanate is not separated off, solutions with an isocyanate content of 42.1% are obtained.

Analysis of the isolated product:

|  | C | H | N | O |
|---|---|---|---|---|
| calculated on the basis of the structure of the corresponding triisocyanate | 60.8 | 3.49 | 18.66 | 17.05 |
| found | 60.7 | 3.52 | 18.8 | 16.9 |

EXAMPLE 4

1044 g (6 mols) of 1-methylbenzene-2,4-diisocyanate are heated to 160°C, and 40 ml of hydrocyanic acid (1 mol) gradually added following the addition of a catalytic quantity of diazabicyclooctane. The oil bath is removed and the temperature maintained by the heat of reaction. After the exothermic reaction had abated, the excess 1-methylbenzene-2,4-diisocyanate is removed by distillation in vacuo. The viscous, clear residue is poured on to a substrate and left to cool, resulting in the formation of a completely dry reaction product which can readily be converted into powder form and is highly soluble in most organic solvents, for example, ethylacetate, acetone, dioxan, or tetrahydrofuran. 550 g of polyisocyanate comprising essentially triisocyanate with an imino-imidazolidine-dione structure, as established by spectroscopy, and an isocyanate content of 22.8% are obtained. The product has a softening point in the range from 145° to 150°C.

|  | C | H | N | O |
|---|---|---|---|---|
| Analysis: calculated on the basis of the structure of the corresponding triisocyanate | 61.20 | 3.46 | 17.85 | 17.49 |
| found | 61.0 | 3.20 | 17.5 | 17.7 |

EXAMPLE 5

0.01 g of N-methylpiperidine and 20 ml of hydrocyanic acid (0.5 mol) are added to 666 g of 3,3,5-trimethyl-5-isocyanatomethyl cyclohexylisocyanate (3mols) followed by heating while stirring to 60°C. The reaction is complete after 3 hours and, after cooling, the polyisocyanate with an iminoimidazolidine-dione structure, as established by spectroscopy, is freed from the monomeric 3,3,5-trimethyl-5-isocyanatomethyl cyclohexylisocyanate by extraction with a polar solvent, for example, hexane.

Following removal of the extractant, 260 g of a polyisocyanate comprising essentially diisocyanate are obtained; viscosity: $\eta_{20°C}$: 80,300 cP; isocyanate content: 17.9%.

EXAMPLE 6

0.02 g of diazabicyclooctane and 20 ml (0.5 mol) of hydrocyanic acid are added to 1110 g of 3,3,5-trimethyl-5-isocyanatomethyl cyclohexylisocyanate (5 mol), followed by stirring for 1 hour at 170°C, 330 g of a polyisocyanate comprising essentially triisocyanate with an imino-imidazolidine-dione structure as established by spectroscopy, and an isocyanate content of 18.1% are obtained following extraction with cyclohexane.

EXAMPLE 7

1680 g of hexamethylene diisocyanate (10 mols) are heated to 180°C with 0.5 g of potassium cyanide, and 40 ml of hydrocyanic acid (1 mol) slowly added dropwise at this temperature. After 1 hour at this temperature, the excess hexamethylene diisocyanate is removed by thin-layer distillation and a polyisocyanate comprising essentially triisocyanate with an imino-imidazolidine-dione structure, as established by spectroscopy, is obtained in a yield of 535 g; viscosity $\eta_{20°C}$: 3500 cP; isocyanate content: 23.6%.

EXAMPLE 8

1250 g of 4,4'-diphenylmethane diisocyanate (5 mols) are melted and 0.05 g of diazabicyclo-(2,2,2)-octane added to the resulting melt. 20 ml of hydrocyanic acid (0.5 mol) are slowly added dropwise with stirring at 160°C. On completion of the exothermic reaction, the reaction mixture is stirred for 30 minutes at this temperature. Petroleum ether and xylene are used as extractant to isolate a polyisocyanate comprising essentially triisocyanate with an imino-imidazolidine-dione structure, as established by spectroscopy. The polyisocyanate obtained (390 g) is white to yellow in color and has a softening point above 180°C for an isocyanate content of 16.0%.

In some cases, it has proved to be of considerable advantage not to isolate the polyisocyanates of imino-imidazolidine-dione structure, but instead to use them in admixture with the excess diisocyanate as a non-light-stable component in lacquers, films and foams.

EXAMPLE 9

60 ml of hydrocyanic acid (1.5 mol) are added at 20°C to 2523 g of hexamethylene diisocyanate (15 mols), and the reaction mixture slowly added dropwise into a tube heated to 180°C and filled with a basic catalyst, for example, potassium cyanide, and supporting material. The polyisocyanate of imino-imidazolidine-dione structure is isolated by extraction or thin-layer distillation. A polyisocyanate consisting essentially of triisocyanate with an isocyanate content of 23.5% and a viscosity $\eta_{20°C}$ of 3220 cP, is obtained in a yield of 750 g.

EXAMPLE 10

841 g of hexamethylene diisocyanate (5 mols) and 42.5 g of acetone cyanhydrin (0.5 mol) are heated to 160°C in the prsence of 0.05 g of triethylamine, producing a gentle reflux which is identified as acetone. After 2 hours at 160°C, the reaction mixture is left to cool to room temperature and a polyisocyanate with an imino-imidazolidine-dione structure comprising essentially triisocyanate is isolated by thin-layer distillation in a yield of 280 g. The isocyanate content found amounts to 23.6%. The polyisocyanates obtained by this procedure are identical to those synthesized directly from hydrogen cyanide and hexamethylene diisocyanate.

EXAMPLE 11

19.5 g of the monohydrocyanic adduct with hexamethylene diisocyanate (0.1 mol) (U.S. Pat. No. 3,684,773) are added to 252 g of hexamethylene diisocyanate (1.5 mol), and the mixture kept for 4 hours at 120°C following the addition of one drop of triethylamine. After cooling, excess hexamethylene diisocyanate is separated off by distillation and subsequent extraction. A polyisocyanate comprising essentially triisocyanate with an imino-imidazolidine-dione structure, an isocyanate content of 23.5% and a viscosity $\eta_{20°C}$ of 3580 cP is obtained in a yield of 51 g.

Prolonged heat treatment in the presence of triethylamine leads to products with viscosities $\eta_{20°C}$ of around 60,000 cP to 120,000 cP.

EXAMPLE 12

Hexamethylene diisocyanate (10 mols) and hydrocyanic acid (1 mol) are introduced into a stirrer-equipped vessel and triethylamine (0.01 mol) is added dropwise with external cooling at a temperature of 20°C. The reaction is complete after about 20 minutes by which time the hydrocyanic acid has been quantitatively reacted. The reaction mixture is heated for 1 hour to 40°C, after which the excess hexamethylene diisocyanate is removed by thin-layer distillation in a high vacuum. A clear, oily residue is obtained which has an isocyanate content of 23.1% NCO and a viscosity of 3420 cP at 25°C and whose further analytical data show that it is an idealized diisocyanate in accordance with the following equation:

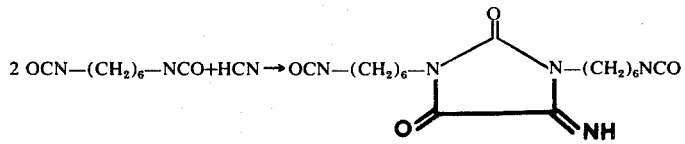

| | C | H | N | O |
|---|---|---|---|---|
| Analysis: calculated on the basis of the structure of the corresponding diisocyanate | 56.18 | 6.93 | 19.27 | 17.61 |
| found | 56.0 | 6.7 | 19.0 | 17.8 |

36.3 g of the polyisocyanate of imino-imidazolidine-dione structure (23.1% NCO) synthesized according to Example 12 are dissolved in 200 ml of isopropanol and the resulting solution boiled under reflux for 4 hours. The excess isopropanol is distilled off and the oily residue analyzed. Yield: 48 g of a diurethane of the following idealized structure.

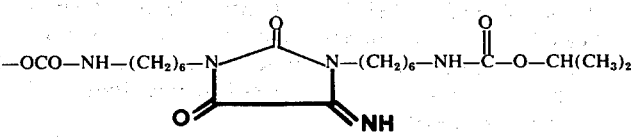

| | C | H | N | O |
|---|---|---|---|---|
| Analysis: calculated | 57.12 | 8.55 | 14.48 | 19.85 |
| found | 57.2 | 8.6 | 14.1 | 20.0 |

Mw. calculated: 483.60; found: 525

EXAMPLE 13

15 mols of 1-methylbenzene-2,4-diisocyanate and 1 mol of hydrocyanic acid are introduced into a stirrer-equipped vessel, followed by the gradual addition, with external cooling, of 0.005 mol of diazabicyclo-(2,2,2)-octane which produces a slight exothermic reaction. The reaction mixture is stirred for 1 hour at 120°C, and the excess 1-methylbenzene-2,4-diisocyanate subsequently extracted from the reaction product by the repeated addition of cyclohexane or cleaning spirit. Removal of the excess extractant by distillation leaves a white, solid product softening at 135°–140°C which, idealized, represents the following diisocyanate and is identified by known analytical techniques.

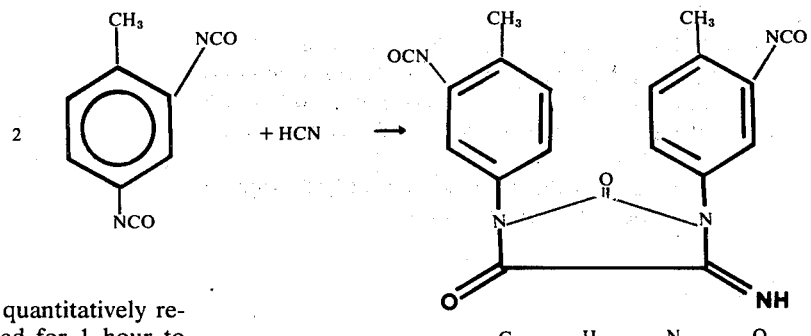

| | C | H | N | O |
|---|---|---|---|---|
| Analysis: calculated on the basis of the structure of the corresponding diisocyanate | 60.8 | 3.49 | 18.66 | 17.05 |
| found | 60.9 | 3.70 | 18.40 | 17.2 |

It is to be understood that any of the organic polyisocyanates disclosed as novel herein can be prepared in accordance with the process of the foregoing examples by substitution of an appropriate organic polyisocyanate for the ones used in the examples. Moreover, urethanes of the organic polyisocyanates may be prepared as described in Example 3 and 12.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate corresponding to the general formula

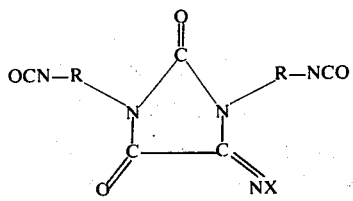

in which
R represents an aliphatic $C_2$–$C_{12}$ hydrocarbon radical, a cycloaliphatic $C_4$–$C_{15}$ hydrocarbon radical, an aromatic $C_6$–$C_{15}$ hydrocarbon radical or an araliphatic $C_7$–$C_{15}$ hydrocarbon radical, and
X represents hydrogen or a group of the formula

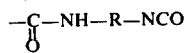

wherein R has the same meaning as above.

2. A polyisocyanate as claimed in claim 1, wherein R represents an aliphatic hydrocarbon radical with 4 to 8 carbon atoms or a cycloaliphatic hydrocarbon radical with 5 to 10 carbon atoms.

3. A process for the production of polyisocyanates corresponding to the general formula

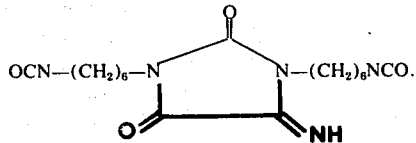

where R and X are as defined in claim 1, wherein 1 mol of hydrocyanic acid or a quantity, corresponding to 1 mol of hydrocyanic acid, of a compound which liberates hydrocyanic acid is reacted with at least 2 mols of an organic diisocyanate corresponding to the general formula $R(NCO)_2$ at a temperature of from $-25°$ to $+200°C$.

4. A compound having the formula

OCN—$(CH_2)_6$—N⟨...⟩N—$(CH_2)_6$NCO.

5. A compound having the formula

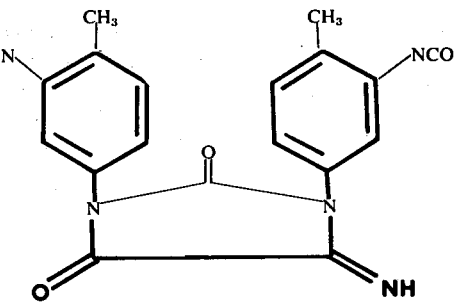

* * * * *